June 26, 1956 J. M. COYNER 2,751,882
TRACTOR AND TRUCK SPRAY APPARATUS
Filed Feb. 26, 1953 2 Sheets-Sheet 2
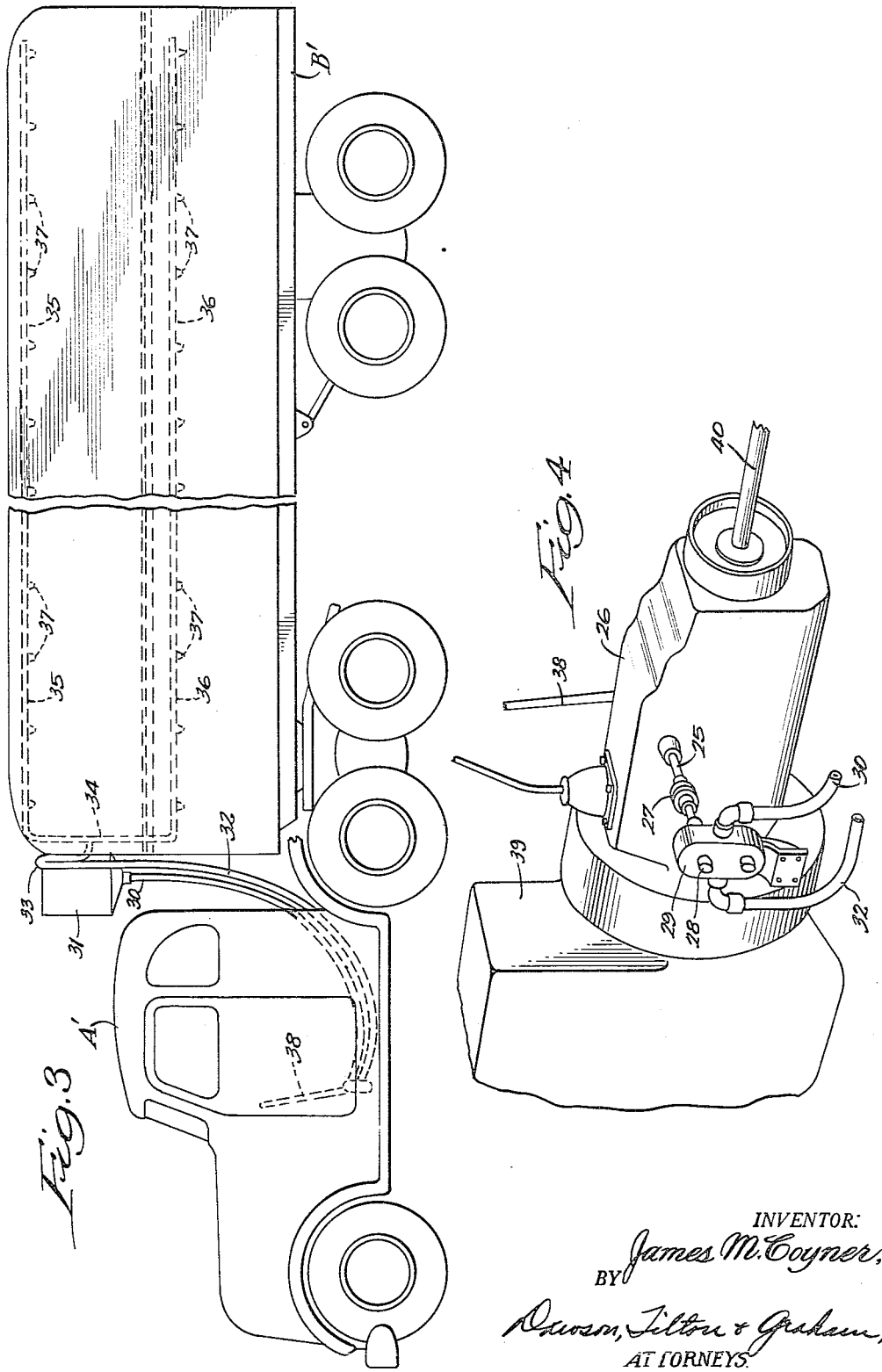
INVENTOR:
James M. Coyner,
BY
Dawson, Tilton & Graham,
ATTORNEYS

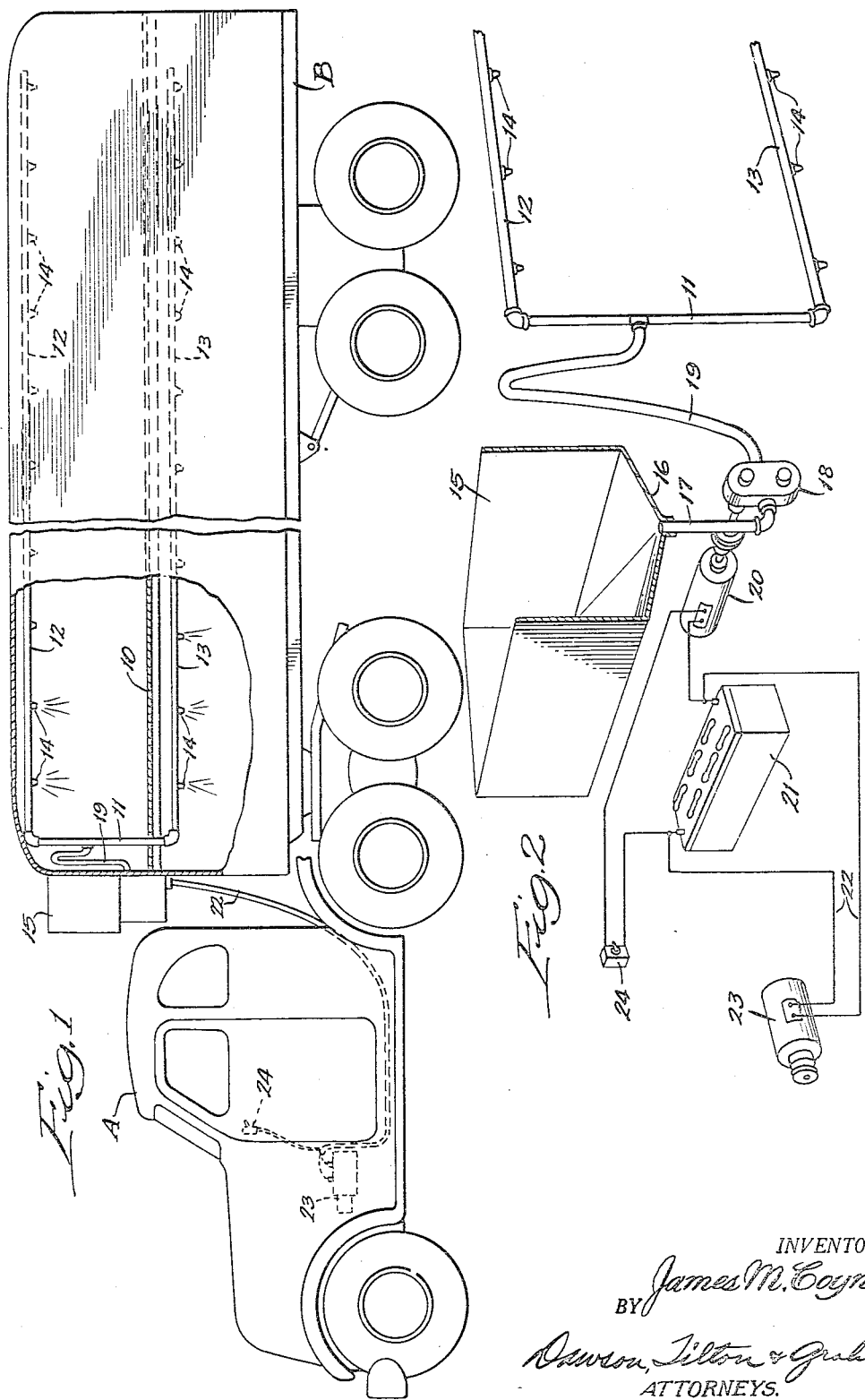

United States Patent Office 2,751,882
Patented June 26, 1956

2,751,882

TRACTOR AND TRUCK SPRAY APPARATUS

James M. Coyner, Madison, Wis.

Application February 26, 1953, Serial No. 339,110

4 Claims. (Cl. 119—7)

This invention relates to tractor and truck spray apparatus, and more particularly to a livestock truck in which dogs, cattle and other livestock are carried long distances in a truck.

Considerable losses are experienced daily in the transportation of livestock because of the overheating of the stock. Further, state laws forbid the drenching of hogs and other livestock because of the washing of the litter and the destruction of the litter. In the shipment of livestock by truck, it is found that traffic jams requiring the truck to stand in heavy traffic for long periods of time are often responsible for the death of the stock while at other times extended travel in dry areas before the livestock can be cooled, brings about the losses. The problem has become increasingly difficult because of ordinances recently passed in towns and villages forbidding the watering of livestock around filling stations, etc.

I have discovered that by employing fine spray nozzles, a mist can be created which will effectively cool the stock while at the same time avoiding drenching of the litter. Further, by forming such mist while the car is in transit, the mist is more effective in evaporating about the stock and cooling the stock and there is substantially no moisture that tends to collect about the litter. Further, by connecting the truck structure with the tractor structure, it is possible for the driver to create the mist about the stock at the desired times and particularly in such emergency periods as may be caused in traffic jams, while at the same time utilizing the tractor motor for supplying the power for spraying and for controlling the formation of the spray.

An object of the present invention is to provide apparatus as described above for accomplishing the new desired results. A further object is to provide in the tractor and trailer combination a water supply tank on the trailer and connections with the tractor motor whereby pumping is brought about under the control of the operator in the tractor at selected times. Yet another object is to provide in the structure shown means for preventing leaking of water through the jets or spray nozzles, etc. A still further object is to provide specific means for maintaining a battery charged upon the trailer in operative relation with a pump below a tank for operating the motor through switch controls on the tractor. Other specific objects and advantages will appear as the specification proceeds.

The invention is shown, in illustrative embodiments, by the accompanying drawings, in which—

Figure 1 is a side view in elevation of tractor and trailer structure equipped with apparatus embodying my invention; Fig. 2, a diagrammatic view showing the wiring layout and the parts associated therewith; Fig. 3, a view similar to Fig. 1 but showing a modified form of the invention; and Fig. 4, a perspective view of the power take-off and pump parts associated therewith.

In the structure shown in Figs. 1 and 2, A designates a tractor and B designates a trailer. It will be understood that the tractor and trailer structures may be of any suitable construction or type. Depending upon whether large animals such as cattle or smaller animals such as hogs are to be carried, the trailer B is shown provided with one or more floors and as herein disclosed a longitudinal floor 10 is shown dividing the trailer compartment longitudinally into two compartments adapted to receive hogs. In the specific illustration given, the trailer B is provided with a water line 11 connected with an upper manifold 12 and a lower manifold 13. Each of the manifolds is provided with spray nozzles 14 adapted to form a fine mist about the livestock.

Upon the front portion of the truck I provide a tank 15, which may be built to conform to the curved front portion of the truck and fit securely thereon. Preferably, the tank is provided with inclined bottom walls 16 leading to a discharge pipe 17 at the lowest point in the bottom of the tank. The pipe 17 communicates with the intake of a gear pump 18, and water is discharged under pressure through the pipe 19 leading to the vertical pipe 11. The gear pump 18 is driven by an electric motor 20, which in turn receives its current from a wet storage battery 21 also supported below the tank 15 and on the trailer B. An electric cable 22 carries wire connections with the motor generator 23 of the tractor A and with the control switch 24 mounted on the dashboard of the tractor. It will be understood that the motor generator is provided with suitable cut-off mechanism for cutting off the flow of current to the battery 21 when it is fully charged.

The looped portion of the pipe 19 is effective in preventing the flow of water from the tank 15 into the pipes 11, 12 and 13, and thereby causing leakage through the nozzles. With the structure shown, the water drains rapidly from the nozzles immediately after the pumping operation and the pipes 11, 12 and 13 are then clear of water. Although the pipes 19 may be provided in the conventional manner with a pressure chamber in which air is trapped and then compressed so as to feed the water steadily under pressure into pipes 11, 12 and 13 I find that the air pressure cylinder may be dispensed with for ordinary purposes and the gear pump 19 utilized for forcing the water directly through the nozzles to form the fine mist desired.

*Operation*

In the operation of the structure shown in Figs. 1 and 2, inclusive, the tank 15 of the trailer is filled with water and the truck 19 is loaded with livestock. When it seems likely that the stock may be becoming overheated, the driver, while the truck may still be in transit, moves the switch 24 to connect the battery 21 with the motor 20. The gear pump 18 is then operated to draw water from the tank 15 and to pass it through the pipes 11, 12 and 13 and thence through the final nozzles 14 to create a mist about the livestock. The operation of the tractor motor through its driven generator 23 continues to supply the battery 21 with current so that the battery is kept in charged condition. The driver, while continuing the journey, may spray the animals at frequent intervals and thus prevent the possibility of overheating. When the tractor, at the end of the journey, is disconnected from the truck, it is merely necessary to disconnect the electric cable with the lines thereof, and in practice, this may be accomplished by simply withdrawing a plug from a socket in the tractor structure.

In the modification illustrated in Fig. 3, the tractor A' is provided with a power take-off shaft 25 leading from the transmission box 26. By means of a coupling 27, the power take-off shaft is connected with the drive shaft 28 of a gear pump 29. Water is conveyed to the inlet end of the pump 29 through the water hose 30 leading from the bottom of the tank 31 mounted upon the trailer B'. Water from the discharge end of the pump is passed through the hose 32 and over a looped portion 33 into a pipe 34 which communicates with the manifolds 35 and 36. Each of the manifolds is provided with a plurality of nozzles 37.

The operation of the power take-off shaft 25 is controlled by a lever 38 and is of well-known construction. In the illustration given in Fig. 4, 39 designates the engine, and 40 designates the propeller shaft. The illustration given is merely representative of well-known construction, and it will be understood that various types of engines, motors and power take-offs may be employed. In view of the common use of tractor motors with power take-off shafts, controlled through levers by the operator, it is believed herein unnecessary to set out such structure in detail.

In the operation of the modified structure shown in Figs. 3 and 4, the driver, when he desires to spray the livestock, simply operates the shaft 38 to connect the power take-off shaft 25 with the gear pump 29, and water is then carried from the tank 30 through the pump and thence through the pipe 32 to the spray pipes 34, 35 and 36. When the pumping ceases, the water drains rapidly through the nozzles, leaving the pipes clear of water. Thus it is possible to form a fine mist for relieving the heat of the livestock while at the same time avoiding drenching of the litter.

In the foregoing structure, the gear pump is lower than the bottom of the tank and this always insures that the pump is primed. Further, the spray line leading from the pump to the spray nozzles extends above the top of the tank or above the water level therein, preventing any possibility of leakage through the spray nozzles when the pump is not in operation. While I prefer to locate the water tank upon the trailer as indicated, it will be understood that the water tank may, if desired, be placed under the truck or at any other suitable location.

While, in the foregoing specification, I have set forth specific structures in considerable detail for the purpose of illustrating embodiments of the invention, it will be understood that such details of structure may be varied widely by those skilled in the art without departing from the spirit of my invention.

I claim:

1. In a livestock vehicle, a cooling means comprising a water tank supported on the vehicle, a conduit in said vehicle along an upper part thereof and connected to said tank, a power-operated pressure pump between said tank and said conduit, control means operatively connected to said pump, and mist-producing nozzles on said conduit, whereby when water is introduced into said conduit under pressure a fine mist will be produced at said nozzles, to cool livestock in said vehicle.

2. In a livestock vehicle as defined in claim 1, said vehicle comprising an automotive truck trailer having a tractor unit for supplying power and propulsion and a trailer unit for carrying the livestock.

3. In a livestock vehicle as defined in claim 2, said tractor unit having a power take-off and said power-operated pressure pump having a driven connection with said power take-off, said control means including regulating means in said tractor unit operable by the operator thereof.

4. In a livestock vehicle as defined in claim 2, said power-operated pressure pump having a separate electric drive motor, and said control means including circuit means having switch control means in said tractor unit for regulating said drive motor and being operable by the operator of the tractor unit.

References Cited in the file of this patent

UNITED STATES PATENTS

| | | |
|---|---|---|
| 239,527 | McPherson | May 29, 1881 |
| 250,862 | Williams | Dec. 13, 1881 |
| 1,673,694 | McLeod | June 12, 1928 |
| 2,480,600 | Paul | Aug. 30, 1949 |
| 2,595,781 | Durham | May 6, 1952 |
| 2,652,024 | Coyner | Sept. 15, 1953 |